United States Patent
Jaradi et al.

(10) Patent No.: US 11,345,306 B1
(45) Date of Patent: May 31, 2022

(54) SEATBELT EXTENSION SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/373,410

(22) Filed: Jul. 12, 2021

(51) Int. Cl.
- *B60R 22/20* (2006.01)
- *B60R 22/26* (2006.01)
- *B60R 22/18* (2006.01)
- *B60R 22/48* (2006.01)

(52) U.S. Cl.
CPC .............. *B60R 22/20* (2013.01); *B60R 22/26* (2013.01); *B60R 2022/1806* (2013.01); *B60R 2022/263* (2013.01); *B60R 2022/485* (2013.01); *B60R 2022/4816* (2013.01); *B60R 2022/4841* (2013.01)

(58) Field of Classification Search
CPC ....... B60R 22/20; B60R 22/203; B60R 22/26; B60R 2022/1806; B60R 2022/263; B60R 2022/4816; B60R 2022/4841; B60R 2022/485

See application file for complete search history.

(56) References Cited

U.S. PATENT DOCUMENTS

| | | | |
|---|---|---|---|
| 6,332,629 B1 * | 12/2001 | Midorikawa | B60R 22/343 |
| | | | 242/390.8 |
| 7,866,703 B2 | 1/2011 | Spahn et al. | |
| 2007/0194565 A1 | 8/2007 | Clute | |
| 2010/0219667 A1 * | 9/2010 | Merrill | B60R 22/195 |
| | | | 297/480 |
| 2019/0202397 A1 * | 7/2019 | Jaradi | B60R 22/1952 |
| 2020/0079317 A1 * | 3/2020 | Jaradi | B60R 22/1958 |
| 2020/0139863 A1 * | 5/2020 | Mori | B60N 2/42763 |
| 2021/0316698 A1 * | 10/2021 | Cristea | B60R 22/48 |

FOREIGN PATENT DOCUMENTS

| | | | | |
|---|---|---|---|---|
| CN | 107985250 A | * | 5/2018 | ............ B60R 22/20 |
| CN | 108639005 A | * | 10/2018 | ............ B60R 22/20 |
| DE | 29906900 U1 | * | 8/1999 | ............ B60R 22/03 |
| DE | 102007004977 A1 | * | 11/2007 | ......... B60R 22/1953 |
| JP | 2007196881 A | | 8/2007 | |
| JP | 2009220644 A | | 10/2009 | |
| JP | 2011037417 A | * | 2/2011 | |
| KR | 20030013962 A | * | 2/2003 | |
| KR | 20050052711 A | * | 6/2005 | |
| KR | 20080017720 A | * | 2/2008 | |
| WO | WO-2018157016 A1 | * | 8/2018 | ............ B60R 22/03 |
| WO | WO-2019013168 A1 | * | 1/2019 | ............ B60R 22/20 |

\* cited by examiner

*Primary Examiner* — Jonathan Ng
*Assistant Examiner* — Scott F. Underwood
(74) *Attorney, Agent, or Firm* — Frank A. MacKenzie; Bejin Bieneman PLC

(57) ABSTRACT

A system includes a base. The system includes a buckle movable away from the base from a retracted position to an extended position. The system includes a lock movable from a locked position that maintains the buckle at the retracted position to an unlocked position that permits movement of the buckle to the extended position. The system includes a spring urging the buckle toward the retracted position.

18 Claims, 8 Drawing Sheets

SEATBELT EXTENSION SYSTEM

BACKGROUND

A vehicle may include a seatbelt assembly. The seatbelt assembly may include a seatbelt retractor and a webbing retractably payable from the seatbelt retractor. The seatbelt assembly may include an anchor coupled to the webbing, and a clip that engages a buckle. The seatbelt assembly may be disposed adjacent a seat of the vehicle. The webbing may extend continuously from the seatbelt retractor to the anchor. For example, one end of the webbing feeds into the seatbelt retractor, and the other end of the webbing is fixed to the anchor. The anchor may, for example, be fixed to the seat. Alternatively, the anchor may be fixed to a vehicle body, e.g., a B-pillar, a floor, etc. The anchor may be attached to the seat in any suitable manner, e.g., with fasteners. The webbing may be fabric, e.g., woven nylon. The clip slides freely along the webbing and, when engaged with the buckle, divides the webbing into a lap band and a shoulder band. The seatbelt assembly may include a D-ring engaged with the webbing. For example, the webbing may freely slide through the D-ring. In other words, the webbing may extend from the anchor through the D-ring to the seatbelt retractor. The D-ring may be spaced from the seatbelt retractor. For example, the D-ring may be disposed between the seatbelt retractor and the roof. As another example, the seatbelt retractor may be adjacent to the floor and the D-ring may be adjacent to the roof. The D-ring may be fixed to the vehicle body, e.g., the B-pillar. The seatbelt assembly may be a three point harness, meaning that the webbing is attached at three points around the occupant when fastened the anchor, the seatbelt retractor, and the buckle. The seatbelt assembly may, alternatively, include another arrangement of attachment points.

DETAILED DESCRIPTION

Figure 1:
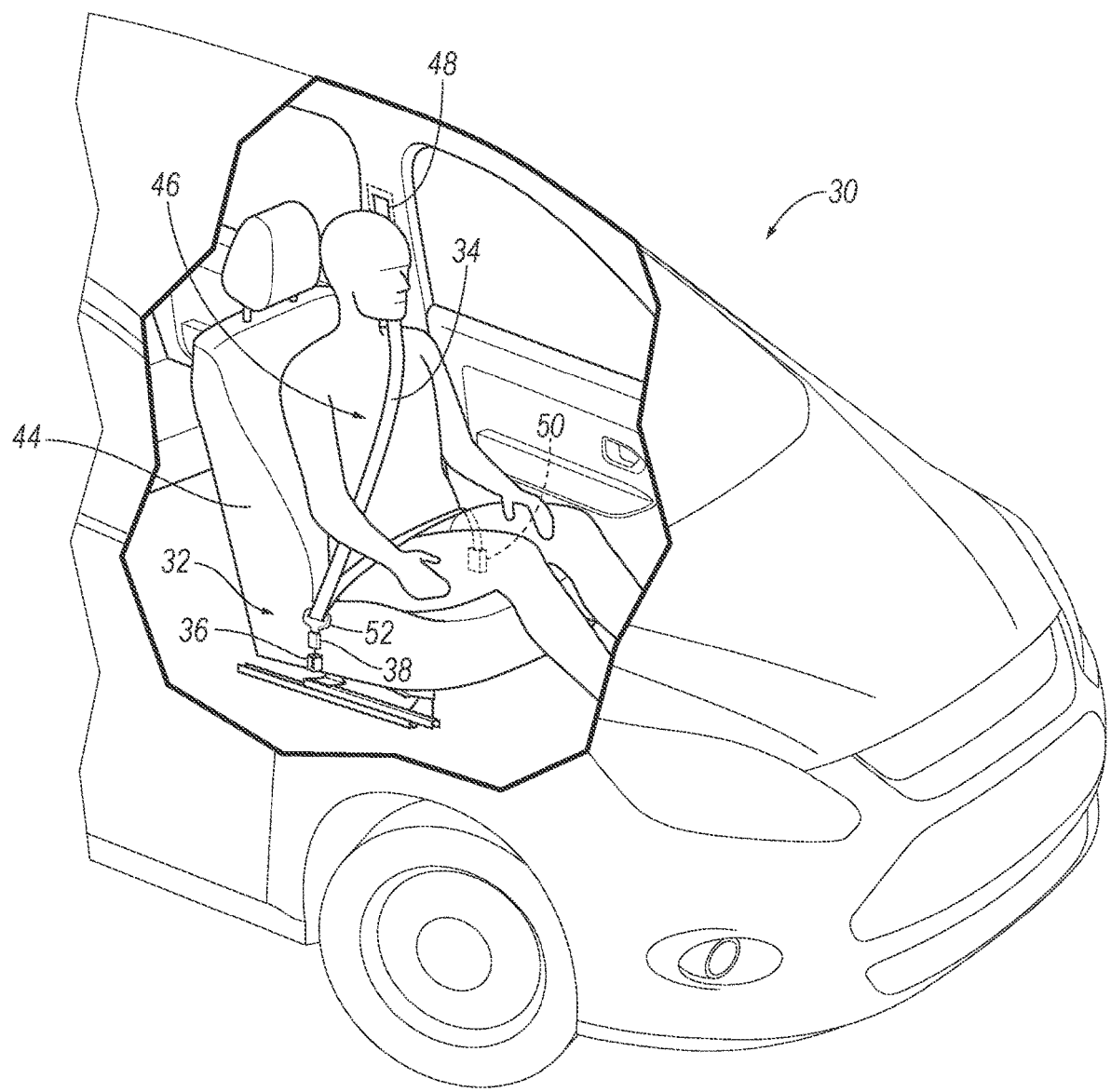
FIG. 1 is a perspective view of a seat and a seatbelt assembly in a vehicle.

A system includes a base. The system includes a buckle movable away from the base from a retracted position to an extended position. The system includes a lock moveable from a locked position that maintains the buckle at the retracted position to an unlocked position than permits movement of the buckle to the extended position. The system includes a spring urging the buckle toward the retracted position.

The system may include a cable connecting the buckle to the base.

The lock in the locked position may inhibit movement of the cable relative to base.

The system may include a plate fixed to the cable, and the spring may be compressed between the base and the plate.

The base may include a top panel and a bottom panel, and the spring may be compressed between the top panel and the plate.

The top panel may define a hole, and the cable may extend through the hole.

The spring may surround the cable.

The base may include a top panel, a bottom panel, and a pair of side panels extending from the top panel to the bottom panel.

The spring may be between the top panel and the bottom panel, and between the pair of side panels.

The system may include a computer having a processor and a memory storing instructions executable by the processor to actuate the lock from the locked position to the unlocked position.

The instructions may include instructions to actuate the lock to the unlocked position in response to determining that tension of a seatbelt is above a predetermined threshold and that a vehicle impact has not been detected.

A system includes a base. The system includes a buckle movable from a retracted position away from the base to an extended position. The system includes a lock moveable from a locked position that maintains the buckle at the retracted position to an unlocked position than permits movement of the buckle to the extended position. The system includes a computer having a processor and a memory storing instructions executable by the processor to actuate the lock from the locked position to the unlocked position in response to determining that tension of a seatbelt is above a predetermined threshold and that a vehicle impact has not been detected.

The instructions may include instructions to actuate the lock to the locked position in response to detecting unbuckling of the buckle.

The system may include a sensor supported at a seatbelt anchor connected to the seatbelt, and the instructions may include instructions to determine that tension of the seatbelt is above the predetermined threshold based on information received from the sensor.

The system may include an impact sensor, and the instructions may include instructions to determine that a vehicle impact has not been detected based on information from the impact sensor.

The system may include a spring urging the buckle toward the retracted position and a cable connecting the buckle to the base.

The system may include a plate fixed to the cable, and the spring may be compressed between the base and the plate.

The base may include a top panel and a bottom panel, and the spring may be compressed between the top panel and the plate.

With reference to FIGS. 1-6, where like numerals indicate like features throughout the several views, a vehicle 30 having a system 32 for decreasing tension of a seatbelt webbing 34 is shown. The system 32 includes a base 36. The system 32 includes a buckle 38 movable away from the base 36 from a retracted position to an extended position. The system 32 includes a lock 40 moveable from a locked position that maintains the buckle 38 at the retracted position to an unlocked position that permits movement of the buckle 38 to the extended position. Movement of the buckle 38 to extended position may reduce tension in the seatbelt webbing 34, e.g., permitting disengagement of a seatbelt retractor 48 such that webbing 34 is seatbelt payable into and/or out of the seatbelt retractor 48, providing increased range of movement for an occupant restrained by the system 32, etc. The system 32 includes a spring 42 urging the buckle 38 toward the retracted position. The spring 42 enables to system 32 to be reset, e.g., by moving the buckle 38 to the retracted position after tension of the seatbelt webbing 34 has decreased.

The vehicle 30, shown in FIG. 1, may be any suitable type of ground vehicle, e.g., a passenger or commercial automobile such as a sedan, a coupe, a truck, a sport utility, a crossover, a van, a minivan, a taxi, a bus, etc.

The vehicle 30 includes one or more seats 44. The seats 44 may be arranged in the passenger cabin in any suitable position, i.e., as front seats, rear seats, third-row seats, etc. The seats 44 may be supported by a floor of the vehicle 30. The seats 44 may be movable relative to the floor to various positions, e.g., movable fore-and-aft and/or cross-vehicle. The seats 44 may be of any suitable type, e.g., a bucket seat.

One or more seatbelt assemblies 46 may be included in the vehicle 30 to control kinematics of occupants of the seats 44. Each seatbelt assembly 46 may include the seatbelt retractor 48. The seatbelt webbing 34 is retractably payable from the seatbelt retractor 48. The seatbelt assembly 46 may include an anchor 50 coupled to the webbing 34, and a latch plate 52 that engages the buckle 38. The seatbelt assembly 46 may be disposed adjacent the seat 44. For example, the seatbelt assembly 46 is adjacent the front seat 44. The webbing 34 may extend continuously from the seatbelt retractor 48 to the anchor 50. For example, one end of the webbing 34 feeds into the seatbelt retractor 48, and the other end of the webbing 34 is fixed to the anchor 50. The anchor 50 may, for example, be fixed to the seat 44. Alternatively, the anchor 50 may be fixed to the vehicle 30 body, e.g., the B-pillar, the floor, etc. The anchor 50 may be attached to the seat 44 in any suitable manner, e.g., with fasteners. The webbing 34 may be fabric, e.g., woven nylon. The latch plate 52 slides freely along the webbing 34 and, when engaged with the buckle 38, divides the webbing 34 into a lap band and a shoulder band. The seatbelt assembly 46 may include a D-ring engaged with the webbing 34. For example, the webbing 34 may freely slide through the D-ring. In other words, the webbing 34 may extend from the anchor 50 through the D-ring to the seatbelt retractor 48. The D-ring may be spaced from the seatbelt retractor 48. For example, the D-ring may be disposed between the seatbelt retractor 48 and the roof. As another example, the seatbelt retractor 48 may be adjacent to the floor and the D-ring may be adjacent to the roof. The D-ring may be fixed to the vehicle body, e.g., the B-pillar. The seatbelt assembly 46 may be a three point harness, meaning that the webbing 34 is attached at three points around the occupant when fastened: the anchor 50, the seatbelt retractor 48, and the buckle 38. The seatbelt assembly 46 may, alternatively, include another arrangement of attachment points.

Figure 2:
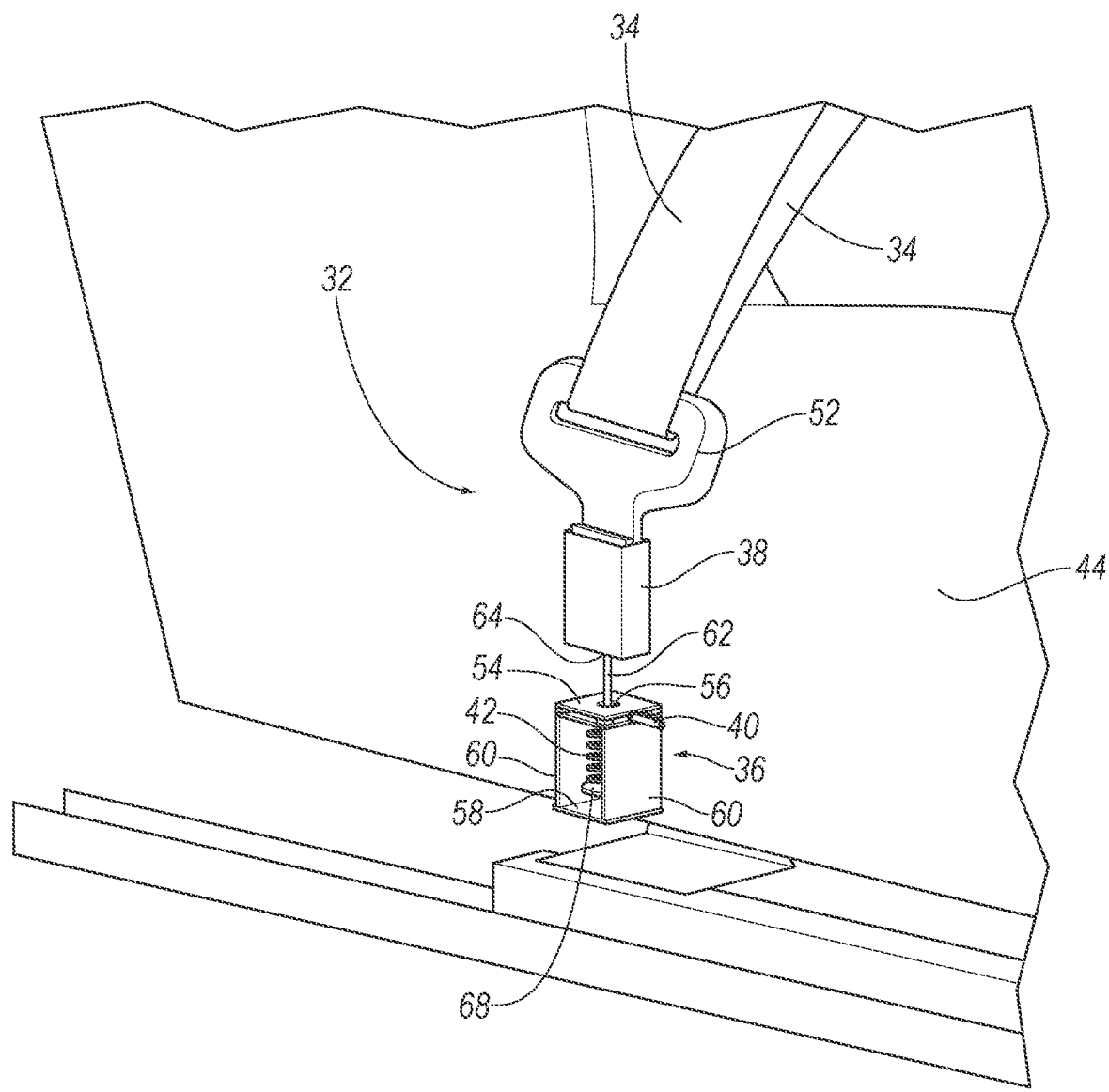
FIG. 2 is a perspective view of a buckle of the seatbelt assembly in a retracted position and attached to the seat.
Figure 5:
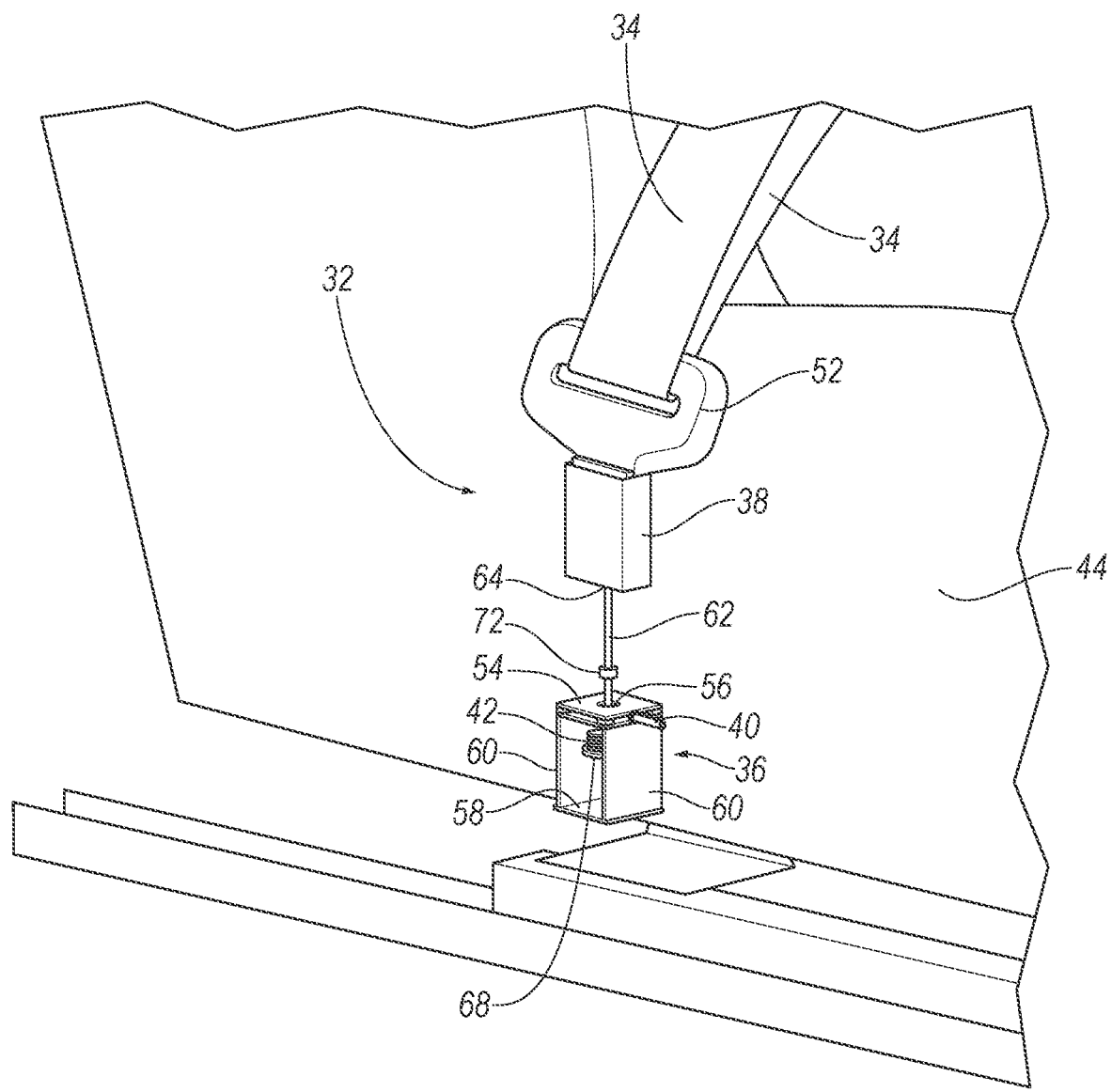
FIG. 5 is a perspective view of the buckle in an extended position and attached to the seat.

The buckle 38 is movable away from the base 36 from the retracted position, shown in FIG. 2 to the extended position, shown in FIG. 5, and vice versa. The buckle 38 in the extended position provides reduced tension to the seatbelt webbing 34, e.g., when the latch plate 52 is coupled to the buckle 38 and compared to tension of the seatbelt webbing 34 when the buckle 38 is in the retracted position.

The base 36 is supported in the passenger cabin. For example, the base 36 may be fixed to the floor, the seat 44, or any other suitable structure. The base 36 is shown as being fixed to the seat 44 in FIG. 2. The base 36 may be metal, or any suitable material.

The base 36 can include one or more top panels 54. Each of the top panels 54 may define a hole 56. The holes 56 may be circular, or any suitable shape. The top panels 54 may be spaced from each other, e.g., with one or more spacers therebetween. The base 36 may include a bottom panel 58. The bottom panel 58 may be between the floor of the vehicle 30 and the top panels 54. The top panels 54 may be spaced from the bottom panel 58. The base 36 may include a pair of side panels 60. The side panels 60 may extend from one of the top panels 54 to the bottom panel 58.

Figure 3:
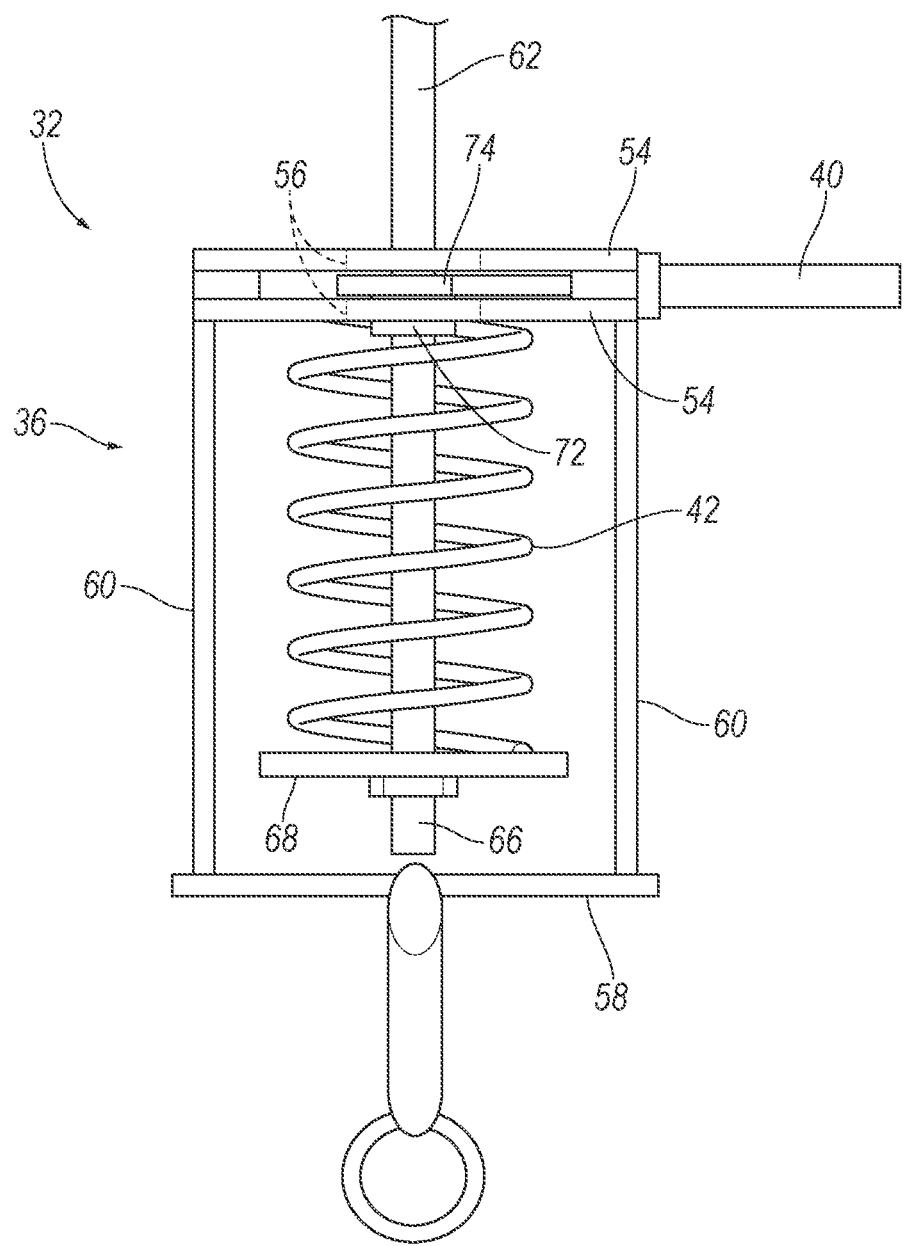
FIG. 3 is a side view of components of the seatbelt assembly in the retracted position, including a lock in a locked position.
Figure 6:
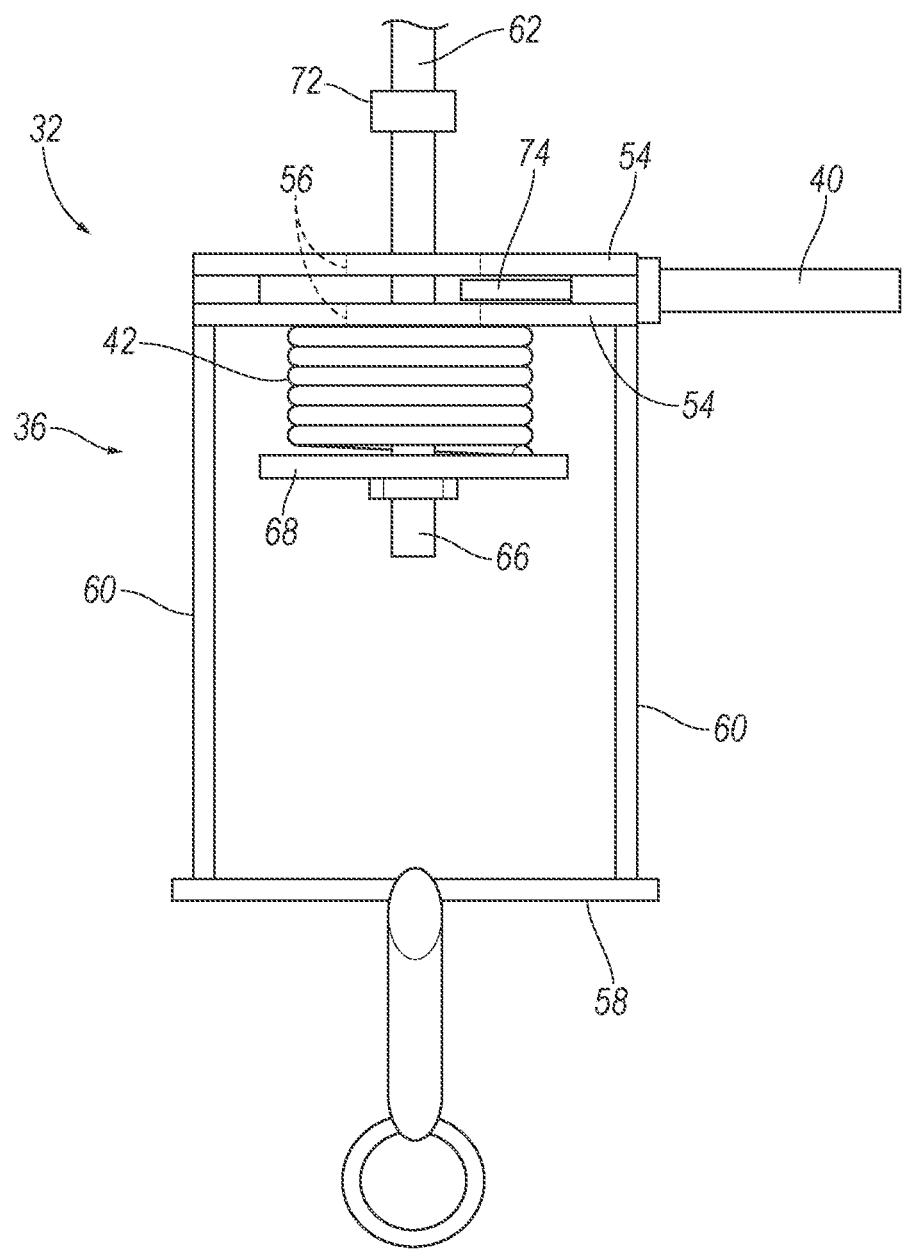
FIG. 6 is a side view of components of the seatbelt assembly in the extended position, including the lock in an unlocked position.

A cable 62 may connect the buckle 38 to the base 36. The cable 62 may extend through, and be slidable within, the holes 56. For example, a first end 64 of the cable 62 may be fixed to the buckle 38, as shown in FIGS. 2 and 5. The first end 64 may be above the top panels 54. A second end 66 of the cable 62 opposite of the first end 64 may be disposed within the base 36, as shown in FIGS. 3 and 6. The second end 66 of cable 62 may be below the top panels 54 and above the bottom panel 58, and between the side panels 60. The cable 62 is flexible relative to the buckle 38 and the top plate 54. The cable 62 may, for example, woven metal.

A plate 68 may be fixed to the cable 62, e.g., to the second end 66 of the cable 62. The top panels 54 may be between the buckle 38 and the plate 68. The plate 68 may be between the top panels 54 and the bottom panels 58, and between the side panels 60. The plate 68 may be closer to the top panels 54 in while the buckle 38 is at the extended position than at the retracted position.

The spring 42 may be a coil compression spring, or any suitable spring that can urge the buckle 38 from the extended position toward the retracted position. The spring 42 may surround the cable 62. The spring 42 may be disposed within the base 36, e.g., between the top panel 54 and the bottom panel 58, and between the pair of side panels 60. The spring 42 may be compressed between the base 36 and the plate 68, e.g., between the top panels 54 and the plate 68. The spring 42 may abut the plate 68 and one of the top panels 54. The spring 42 may urge the plate 68 downward and away from the top panels 54.

Figure 4:
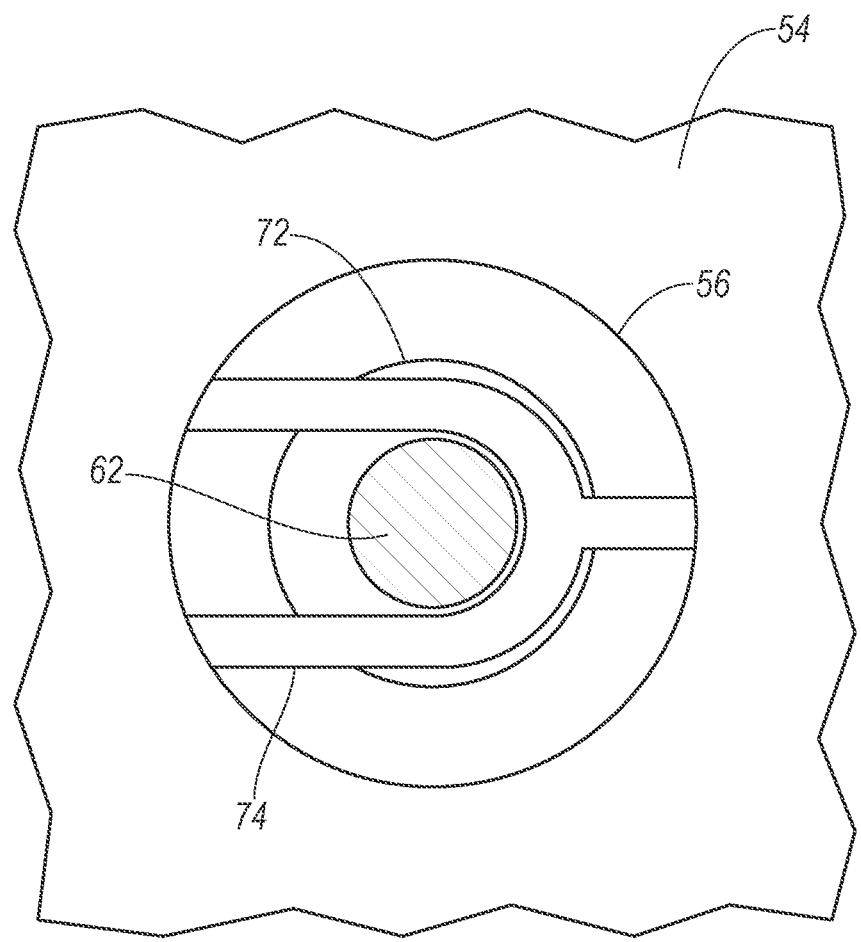
FIG. 4 is a top view of a base of the seatbelt assembly, including the lock in the locked position

The lock 40 controls movement of the buckle 38 relative to the base 36. With reference to FIGS. 3 and 4, the lock 40 in the locked position maintains the buckle 38 at the retracted position, e.g., by inhibiting movement of the cable 62 relative to the base 36. The lock 40 in the locked position may inhibit movement of the cable 62 through the holes 56 of the top panels 54. With reference to FIG. 6, the lock 40 in the unlocked position permits movement of the buckle 38 to the extended position, e.g., by permitting movement of the cable 62 through the holes 56. The lock 40 is moveable from the locked position to the unlocked position, e.g., in response to receiving a command from a computer 70 of the vehicle 30. The lock 40 may include a solenoid or other electromechanical structure that actuates to engage and/or disengage the lock 40 with the cable 62. For example, the lock 40 may include a collar 72 fixed to cable 62 and a U-shaped member 74 operatively coupled to the solenoid such that actuation the solenoid moves the U-shaped member 74 into and out of engagement with the cable 62 and collar 72. The collar 72 may be smaller than the holes 56 of the top panels 54, e.g., to pass therethrough. The U-shaped member 74 may be between one of top panels 54 and the other of the top panels 54. The U-shaped member 74 in the locked position and engaged with the cable 62 may partially surround the cable 62 and abut the collar 72, inhibiting movement of the collar 72 there past. The U-shaped member 74 in the unlocked position and disengaged with the cable 62 may be spaced from the cable 62 and permit movement of the collar 72 there past. The lock 40 may include any other suitable structure for controlling movement of cable 62 and/or the buckle 38 relative to the base 36, such a pin receivable in a hole of the cable 62 (not shown).

Figure 7:
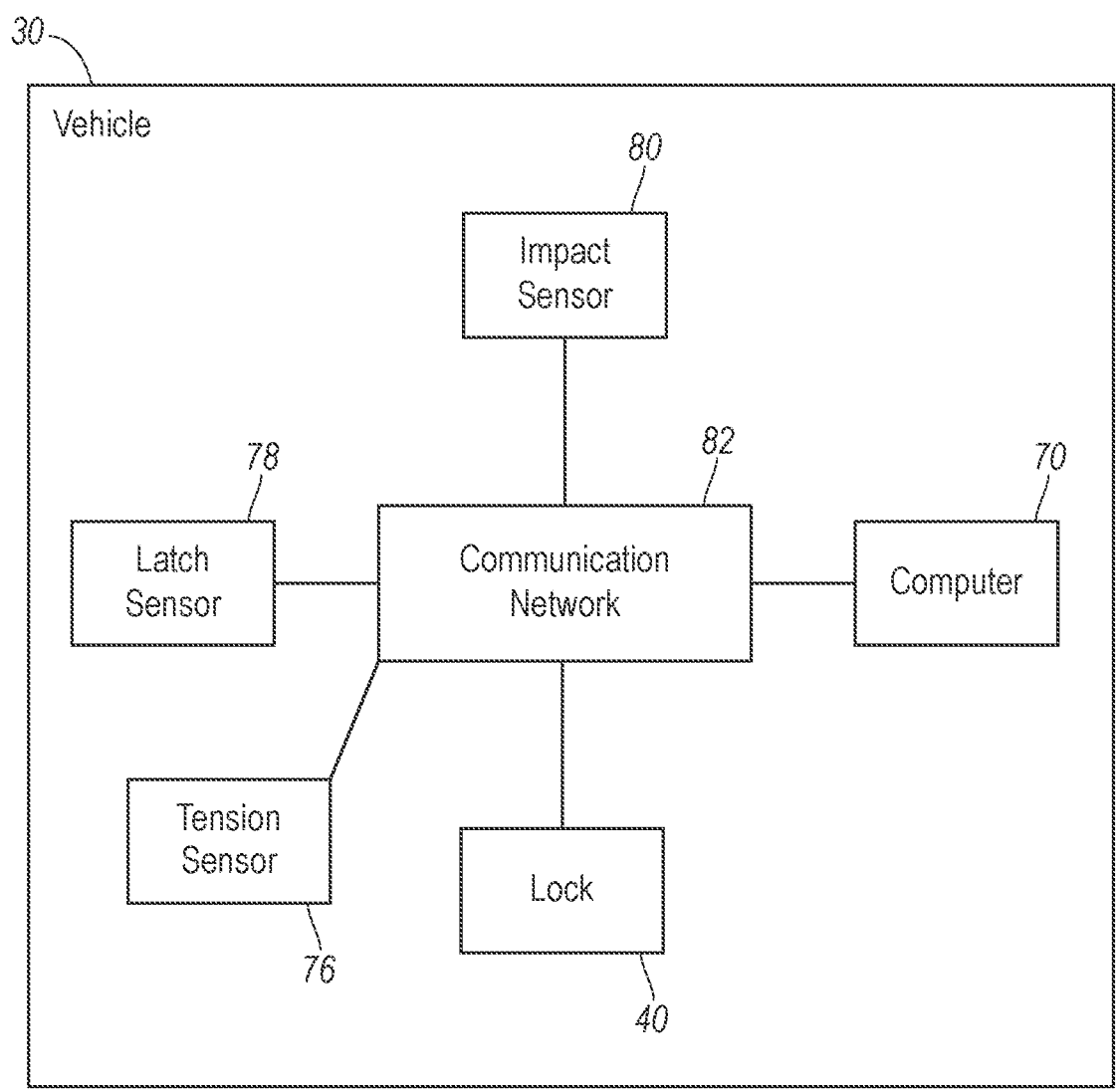
FIG. 7 is a block diagram of components of the vehicle.

With reference now to FIG. 7, the system 32 can include a tension sensor 76 that detects tension of the seatbelt webbing 34. The tension sensor 76 may include a strain gage, or other suitable structure. The tension sensor 76 can be supported at, e.g., fixed to, the seatbelt anchor 50 connected to the seatbelt webbing 34, or at any other suitable location. Tension of the seatbelt webbing 34 may generate stain in anchor 50 and the tension sensor 76 may detect such strain.

The system 32, e.g., the buckle 38, may include a latch sensor 78 that detects when the latch plate 52 is buckled, i.e., when the latch plate 52 is engaged with the buckle 38. The latch sensor 78 may be a switch, a proximity sensor, or any suitable sensor.

The vehicle 30 can include an impact sensor 80 that is configured to detect an impact to the vehicle 30. The impact sensor 80 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 80 may be located at numerous points in or on the vehicle 30.

The computer 70 includes a processor and a memory. The memory includes one or more forms of computer 70 readable media, and stores instructions executable by the computer 70 for performing various operations, including as disclosed herein. For example, the computer 70 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 70 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 70. The memory can be of any type, e.g., hard disk drives, solid state drives, servers, or any volatile or non-volatile media. The memory can store the collected data sent from the sensors.

The computer 70 is generally arranged for communications on a communication network 82 that can include a bus in the vehicle 30 such as a controller area network (CAN) or the like, and/or other wired and/or wireless mechanisms. Via the communication network 82, the computer 70 may transmit messages to various devices in the vehicle 30, and/or receive messages (e.g., CAN messages) from the various devices, e.g., the lock 40, the various sensors 76, 78, 80, etc. Alternatively or additionally, in cases where the computer 70 comprises a plurality of devices, the communication network 82 may be used for communications between devices represented as the computer 70 in this disclosure.

The computer 70 is programed to, i.e., the memory stores instructions executable by the processor to, determine whether the latch plate 52 is buckled or unbuckled from the buckle 38, e.g., based on data received from the latch sensor 78.

The computer 70 is programed to determine whether tension of the seatbelt webbing 34 is above a predetermined threshold based on information received from the tension sensor 76. The computer 70 may determine whether tension of the seatbelt webbing 34 is above the predetermined threshold by comparing tension specified by the tension sensor 76 with the predetermined threshold. The predetermined threshold may be based on empirical testing, e.g., indicating an amount of tension detected when an occupant is leaning on the webbing 34.

The computer 70 is programed to determine whether to determine whether a vehicle impact has been detected based on information from the impact sensor 80. For example, the computer 70 may determine an impact has occurred upon receiving a signal from the impact sensor 80 indicating the impact. The computer 70 may determine an impact has not occurred based on a lack of signal from the impact sensor 80.

The computer 70 is programed to actuate the lock 40 from the locked position to the unlocked position, and vice versa. For example, the computer 70 may send a command to the lock 40 specifying the locked position or the unlocked position. Such command may, for example, energize or de-energize the solenoid. The computer 70 may actuate the lock 40 to the unlocked position in response to determining that tension of the seatbelt webbing 34 is above the predetermined threshold and that a vehicle impact has not been detected, e.g., within a threshold amount of time of determining that tension of the seatbelt webbing 34 is above the predetermined threshold. The instructions include instructions to actuate the lock 40 to the locked position in response to detecting unbuckling of the buckle 38, e.g., after actuating the lock 40 to the unlocked position.

Figure 8:
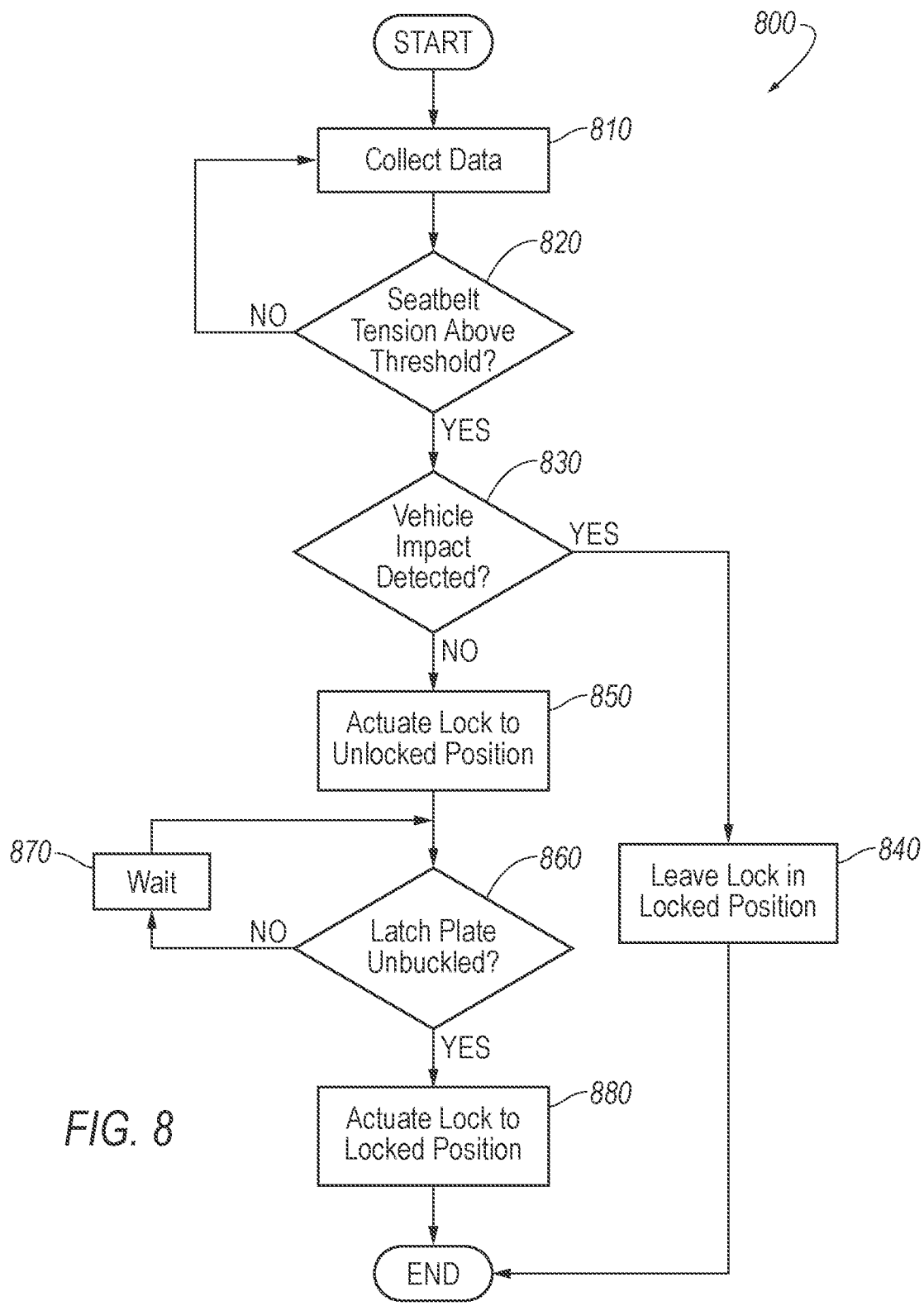
FIG. 8 is a flowchart illustrating a process for controlling the buckle between the retracted position and the extended position.

With reference to FIG. 8, a flow chart illustrating a process 800 for controlling the system 32 is shown. The process 800 starts with the vehicle 30 operating under typical conditions, e.g., with the latch plate 52 buckled into the buckle 38, with tension in the seatbelt webbing 34 below the threshold amount, with the buckle 38 in the retracted position and the lock 40 in the locked position, without having detected an impact to the vehicle 30, etc. At the initial block 810, the computer 70 collects data, e.g., from the buckle 38 sensor, the tension sensor 76, the impact sensor 80, etc., via the communication network 82. The computer 70 may collect such data continuously, at intervals (e.g., every 100 milliseconds), etc. The computer 70 may collect such data throughout the process 800.

Next and at a block, 820 the computer 70 determines whether tension of the seatbelt webbing 34 is above the predetermined threshold. For example, the computer 70 may compare the seat belt tension indicated in the data collected from the tension sensor 76 at the block 810. Upon determining the tension of the seatbelt webbing 34 is above the threshold, the computer 70 moves to the block 830. Upon determining the tension of the seatbelt webbing 34 is above the threshold, the computer 70 moves to the block 830. Upon determining the tension of the seatbelt webbing 34 is not above the threshold, the computer 70 returns to the block 810, e.g., continuously monitoring the data from the tension sensor 76 to determine when the tension in the seatbelt webbing 34 is above the threshold.

At the block 830, the computer 70 determines whether a vehicle impact has been detected, e.g., within a predetermined amount of time of detecting tension above the threshold, e.g., 500 milliseconds and based on data (or a lack thereof) from the impact sensor 80. Upon determining that a vehicle impact has been detected the computer 70 moves to a block 840. Upon determining that a vehicle impact has not been detected the computer 70 moves to a block 850.

At the block 840, the computer 70 leaves the lock 40 in the locked position, e.g., by not commanding the lock 40 to the unlocked position. After the block 840 the process 800 may end. Alternately, the computer 70 may command other vehicle systems that typically are actuated upon impact detection, e.g., inflating airbags.

At the block 850, the computer 70 actuates the lock 40 to the unlocked position, e.g., by transmitting a command specifying such position to the lock 40 and via the communication network 82. Once the lock 40 is unlocked, the tension in the seatbelt webbing 34 may urge the buckle 38 from the retracted position to the extended position.

Next, at a block 860, the computer 70 determines whether the latch plate 52 has been unbuckled from the buckle 38, e.g., based on data from the buckle 38 sensor. Upon determining the latch plate 52 has not been unbuckled the computer 70 moves to a block 870. Upon determining the latch plate 52 has been unbuckled the computer 70 moves to a block 880.

At the block 870, the computer 70 waits a predetermined amount of time, e.g., 500 milliseconds, and the returns to the block 860.

At the block 880, the computer 70 actuates lock 40 to the locked position, e.g., by transmitting a command via the communication network 82. After the block 880 the process 800 may end. Alternately, the computer 70 may return to the block 810.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

Use of "in response to," "based on," and "upon" herein indicates a causal relationship, not merely a temporal relationship.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. A system, comprising:
   a base;
   a buckle movable away from the base from a retracted position to an extended position;
   a lock movable from a locked position that maintains the buckle at the retracted position to an unlocked position that permits movement of the buckle to the extended position; and
   a spring urging the buckle toward the retracted position.

2. The system of claim 1, further comprising a cable connecting the buckle to the base.

3. The system of claim 2, wherein the lock in the locked position inhibits movement of the cable relative to the base.

4. The system of claim 2, further comprising a plate fixed to the cable, and wherein the spring is compressed between the base and the plate.

5. The system of claim 4, wherein the base includes a top panel and a bottom panel, and wherein the spring is compressed between the top panel and the plate.

6. The system of claim 5, wherein the top panel defines a hole, and wherein the cable extends through the hole.

7. The system of claim 2, wherein the spring surrounds the cable.

8. The system of claim 1, wherein the base includes a top panel, a bottom panel, and a pair of side panels extending from the top panel to the bottom panel.

9. The system of claim 8, wherein the spring is between the top panel and the bottom panel, and between the pair of side panels.

10. The system of claim 1, further comprising a computer having a processor and a memory storing instructions executable by the processor to actuate the lock from the locked position to the unlocked position.

11. The system of claim 10, wherein the instructions include instructions to actuate the lock to the unlocked position in response to determining that tension of a seatbelt is above a predetermined threshold and that a vehicle impact has not been detected.

12. A system, comprising:
    a base;
    a buckle movable from a retracted position away from the base to an extended position;
    a lock movable from a locked position that maintains the buckle at the retracted position to an unlocked position that permits movement of the buckle to the extended position; and a computer having a processor and a memory storing instructions executable by the processor to actuate the lock from the locked position to the unlocked position in response to determining that tension of a seatbelt is above a predetermined threshold and that a vehicle impact has not been detected.

13. The system of claim 12, wherein the instructions include instructions to actuate the lock to the locked position in response to detecting unbuckling of the buckle.

14. The system of claim 13, further comprising a sensor supported at a seatbelt anchor connected to the seatbelt, and wherein the instructions include instructions to determine that tension of the seatbelt is above the predetermined threshold based on information received from the sensor.

15. The system of claim 14, further comprising an impact sensor, and wherein the instructions include instructions to determine that a vehicle impact has not been detected based on information from the impact sensor.

16. The system of claim 12, further comprising a spring urging the buckle toward the retracted position and a cable connecting the buckle to the base.

17. The system of claim 16, further comprising a plate fixed to the cable, and wherein the spring is compressed between the base and the plate.

18. The system of claim 17, wherein the base includes a top panel and a bottom panel, and wherein the spring is compressed between the top panel and the plate.

* * * * *